United States Patent [19]

Ikeda

[11] 4,301,585
[45] Nov. 24, 1981

[54] METHOD OF FORMING PLATE HAVING FINE BORES

[75] Inventor: Kunio Ikeda, Tokyo, Japan

[73] Assignee: Ricoh Co., Ltd., Tokyo, Japan

[21] Appl. No.: 147,124

[22] Filed: May 6, 1980

[30] Foreign Application Priority Data

May 31, 1979 [JP] Japan .................................. 54-67668
May 31, 1979 [JP] Japan .................................. 54-67669
Jun. 5, 1979 [JP] Japan .................................. 54-70202

[51] Int. Cl.³ ............................................ B23P 15/16
[52] U.S. Cl. ............................. 29/157 C; 29/163.5 R;
204/6; 204/11; 204/281; 264/293
[58] Field of Search ........... 29/157 C, 163.5 R, 527.2;
204/6, 11, 281; 264/293

[56] References Cited

U.S. PATENT DOCUMENTS

| | | | |
|---|---|---|---|
| 1,646,602 | 10/1927 | Smith | 29/157 C |
| 2,123,297 | 7/1938 | Beynen et al. | 29/163.5 R |
| 3,046,202 | 7/1962 | Horner et al. | 204/11 |
| 3,591,915 | 7/1971 | Roberts | 29/157 C |
| 3,891,514 | 6/1975 | Klemm | 204/281 |
| 4,028,448 | 6/1977 | Hashimoto et al. | 264/293 |
| 4,229,265 | 10/1980 | Kenworthy | 204/11 |
| 4,247,513 | 1/1981 | Liu | 264/293 |

OTHER PUBLICATIONS

Xerox Disclosure Journal, vol. 4, No. 2, Mar./Apr. 1979, pp. 251, 252.

Primary Examiner—Daniel C. Crane
Attorney, Agent, or Firm—Oblon, Fisher, Spivak, McClelland and Maier

[57] ABSTRACT

A method of forming a plate having a plurality of uniform and precisely sized fine bores. The method comprises winding around a mold member a wire having a diameter equal to that of the fine bores to be formed, forming an electro-cast layer on the mold member, superposing and uniting another mold member to the first-mentioned mold member, removing only the wire to a predetermined depth to form a mold, forming a plurality of plastic sheets using this mold, effecting a treatment for obtaining a conductivity on each plastic sheet to form an electro-cast master, forming an electro-cast film using this electro-cast master and separating the electro-cast layer thereby to form the plates having fine bores dispersed and sized uniformly and finished at high circularity and cylindricalness.

1 Claim, 43 Drawing Figures

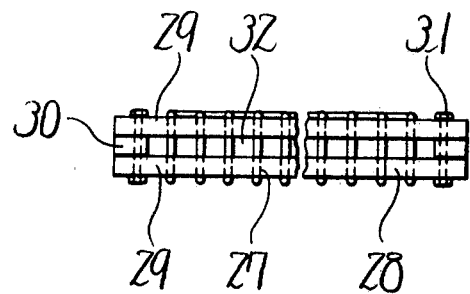
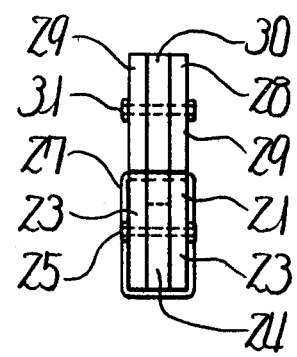
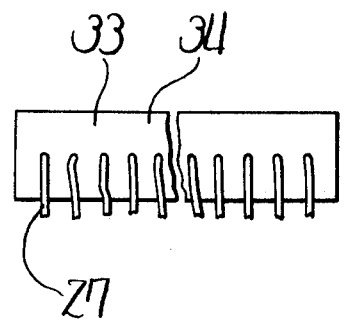

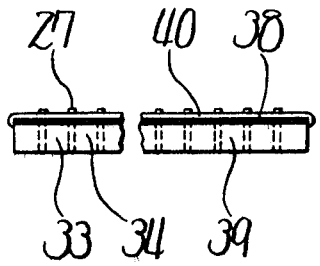
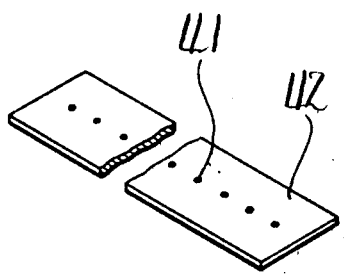
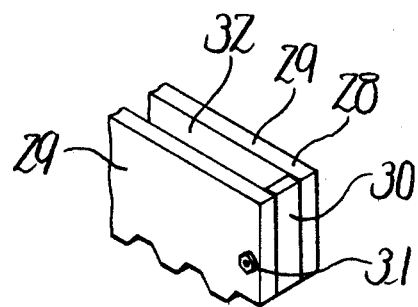
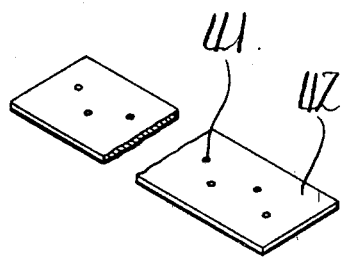
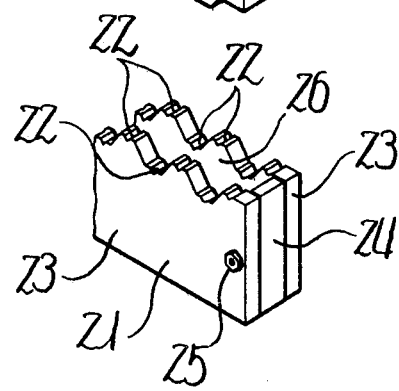

METHOD OF FORMING PLATE HAVING FINE BORES

BACKGROUND OF THE INVENTION

The present invention relates to a method of producing a multi-nozzle head used in ink jet plotters.

Nozzles of ink jet plotter usually has a diameter of around 30μ. Various methods have been used for forming fine nozzle bores of the above-mentioned order by a direct processing of the raw material, such as photo-etching, mechanical processing with micro-drill, laser beam processing, electron beam processing and so forth.

These conventional processes, however, cannot provide satisfactorily high precision of diameter, circularity and cylindricalness of the fine nozzle bore, and cannot be suitably used particularly in the production of multi-nozzle heads in which uniform formation of a plurality of nozzle bores is an essential requisite.

For these reasons, indirect processing such as photo-electro forming have been adopted. Such indirect processing method, however, causes a melting of the material at the ends of the nozzle bore, resulting in a deteriorated cylindricalness of the bore. In addition, the process is impractically long and, hence, involves many factors which affect the diameter and circularity of the nozzle bore. Further, these indirect processing methods usually require a high initial cost.

SUMMARY OF THE INVENTION

It is, therefore, a first object of the invention to produce a multi-head nozzle in which each fine nozzle bores are finished at a high precision and the nozzle bores are arranged at a high precision of pitch and array.

It is a second object of the invention to make it possible to mass-produce a large quantity of products of a uniform quality.

Other objects of the invention will become clear from the following description of the preferred embodiments taken in conjunction with the accompanying drawings.

BRIEF DESCRIPTION OF THE DRAWINGS

FIG. 15 is a plan view of the mold shown in FIG. 14;

FIG. 16 is a side elevational view of the mold shown in FIG. 14;

FIG. 17 is a front elevational view of a substrate with a wire;

FIG. 22 is a side elevational view of a step of forming an electro-cast film;

FIG. 23 is a perspective view of a plate having fine bores;

FIG. 24 is a perspective view of a part of a modification of the holding member and pouring mold;

FIG. 25 is a perspective view of a plate formed by means of the assembly shown in FIG. 24;

DESCRIPTION OF THE PREFERRED EMBODIMENTS

Figure 1:
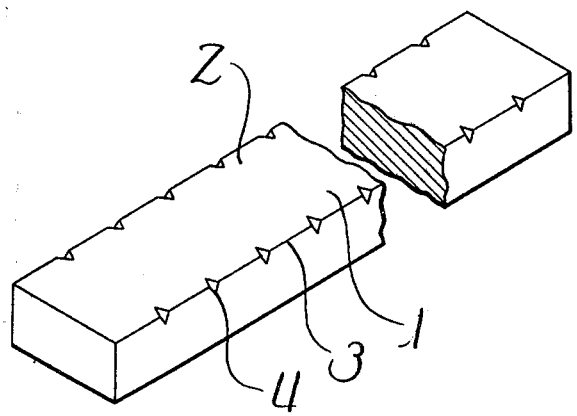
FIG. 1 is a perspective view of a mold member used in a first embodiment of the invention.
Figure 2:
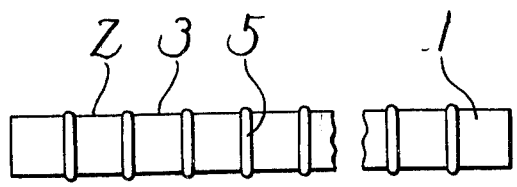
FIG. 2 is a side elevational view of a mold member around which a wire is wound.
Figure 3:
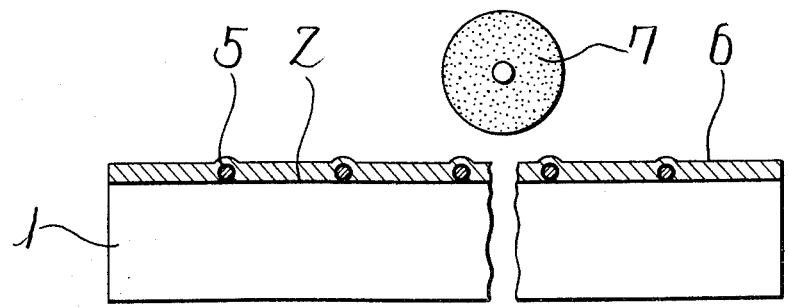
FIG. 3 is a longitudinal sectional view of a mold member around which an electro-cast layer is formed.
Figure 4:
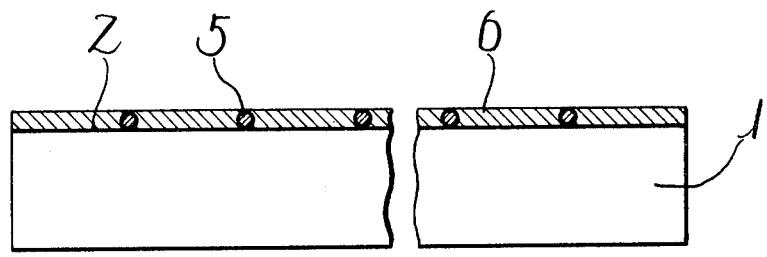
FIG. 4 is a longitudinal sectional view of the core member with the electro-cast layer polished.
Figure 5:
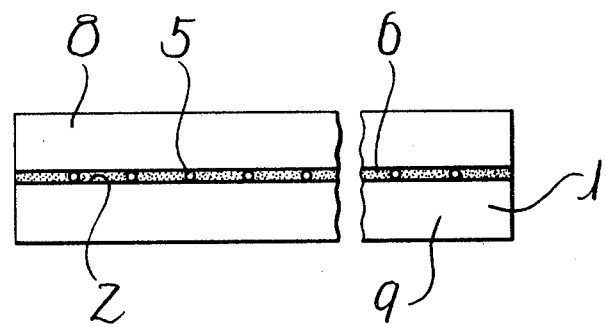
FIG. 5 is a plan view in the state clamped by another mold member.
Figure 6:
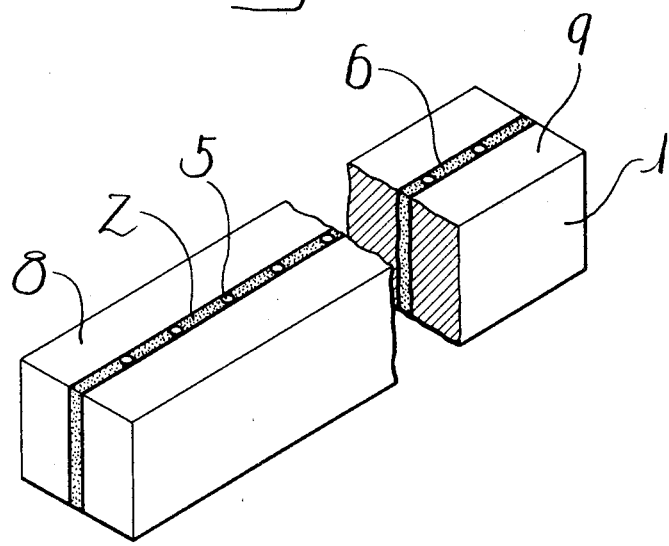
FIG. 6 is a perspective view of the state known in FIG. 6.
Figure 7:
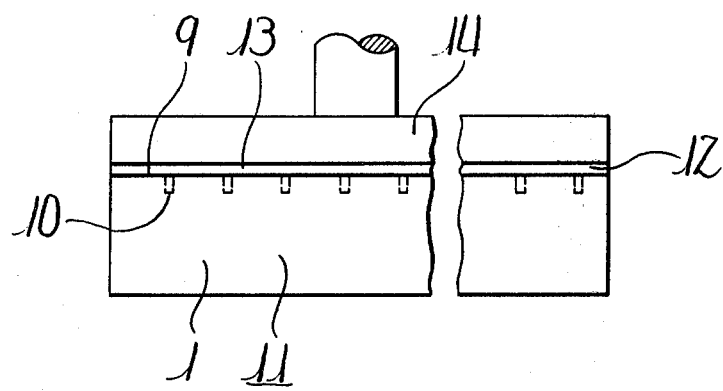
FIG. 7 is a side elevational view in the state of formation of the plastic sheet.
Figure 8:
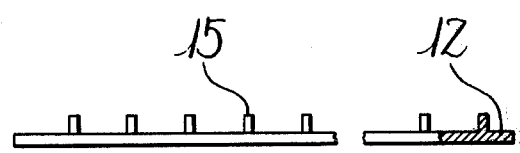
FIG. 8 is a side elevational view of a plastic sheet with a part thereof cut away.
Figure 9:
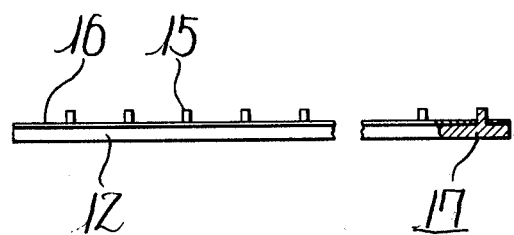
FIG. 9 is a partly cut-away side elevational view of an electro-cast master.
Figure 10:
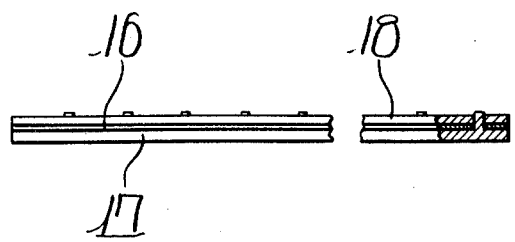
FIG. 10 is a partly cut-away side elevational view of an electro-cast master with an electro-cast film formed thereon.
Figure 11:
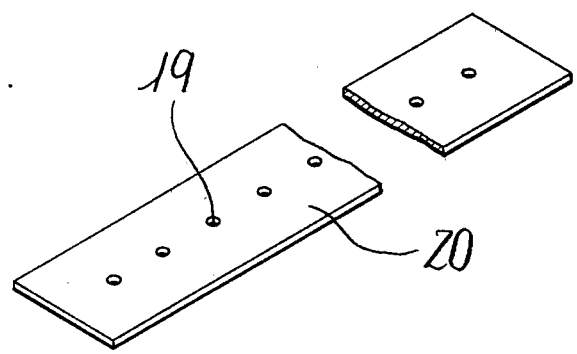
FIG. 11 is a perspective view of a plate.
Figure 12:
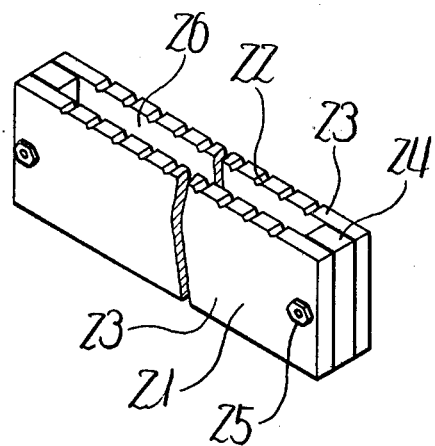
FIG. 12 is a perspective view of a holding member used in the second embodiment of the invention.
Figure 13:
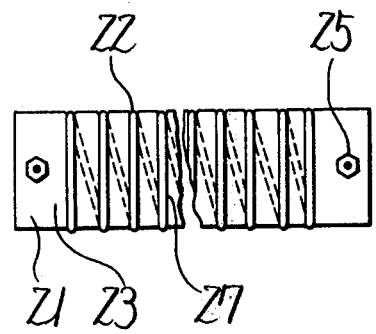
FIG. 13 is a front elevational view of the holding member in the state of winding of a wire.
Figure 14:
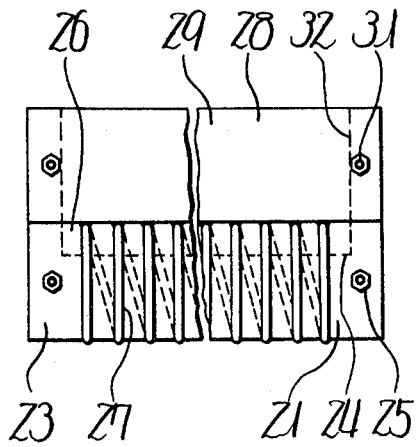
FIG. 14 is a front elevational view of a pouring mold in the set state.
Figure 18:
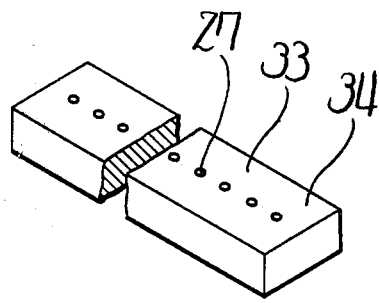
FIG. 18 is a perspective view of the substrate before the polishing.
Figure 19:
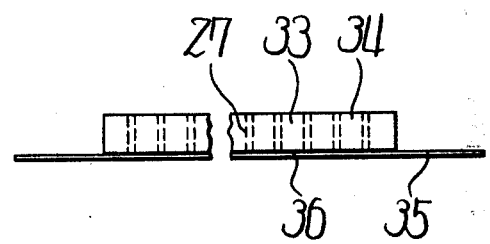
FIG. 19 is a side elevational view of the substrate under polishing.
Figure 20:
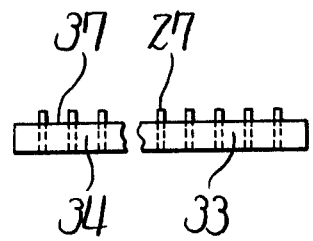
FIG. 20 is a side elevational view of the substrate under etching.
Figure 21:
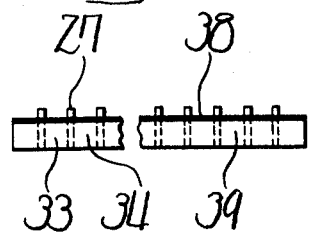
FIG. 21 is a side elevational view of an electro-cast substrate after a treatment for imparting electric conductivity.

A first embodiment of the invention will be described hereinunder with reference to FIGS. 1 to 11 inclusive. A rectangular parallelepiped mold member 1 has a flat surface 2 at both side edges of which formed are a plurality of guide notches at a pitch P. A wire 5 having a diameter coinciding with the desired diameter of the bore to be formed, e.g. 30μ is wound around the mold member 1, guided by the guide notches 4, and arrayed in parallel on the surface 2 at the regular pitch P. The wire 5 is made of copper. An electro-cast layer 6 is formed on the flat surface 2 to have a thickness large enough to embed the wire 5 arranged in parallel on the surface 2. The external surface of the electro-cast layer is ground and polished smoothly by means of a grinder 7 and other tools. Another core mold 8 of the same material as the first-mentioned mold 1 is fixed to the polished surface by soldering or by means of screws or the like fastening means. Then, a polished surface 9 is formed in the direction perpendicular to the wire 5. Then, the assembly is dipped in a warm bath of 10% sodium cyanide to dissolve and remove the wire 5 to a predetermined depth. The efficiency of the removing work is increased by a simultaneous use of ultrasonic wave. It is also possible to effect an electrolysis with a small electric current. In case that the wire 5 is an aluminum wire, it is removed by dipping the assembly in a warm solution of sodium hydroxide. The depth of which the wire is removed depends on the thickness of a final product plate which will be described later, and is typically 0.1 to 0.3 mm. Practically, a depth of 0.1 mm or so is sufficient. By the removal of the wires 5, a mold 11 is formed to have a plurality of recesses or cavities 10 each having an inside diameter conforming that of the wire 5.

A plastic sheet 12 is formed using the mold 11 formed by the above-explained process. More practically, a sheet of a thermoplastic resin 13 such as of vinyl chloride is placed on the polished surface 9 and is pressed by a pressing mold 14 while being heated. After the cooling and separation, formed is the plastic sheet 12 having a plurality of projections 15. On the plastic sheet 12 thus formed, a film 16 is formed by a treatment for producing a conductivity. This treatment can be effected by a silver-mirror reaction (Ag), evaporation (Cu) and non-electrolytic plating (Ni). A plurality of electro-cast master 17 are formed in the described manner from a single mold 11.

Then, an electro-cast film 18 is formed on each electro-cast master 17. Various electro-cast baths may be used for the formation of the electro-cast film 18. For instance, a nickel sulfaminete bath containing 400 g/l of nickel sulfaminete, 10 g/l of nickel chloride, 40 g/l of boric acid and a surface active agent for preventing pit can be used as the electro-cast bath. The electro-casting is conducted preferably under the condition of liquid temperature of 40°–60° C., PH value of 3.5–4.5 and an electric current density of 2.5 to 20 A/dm². The casting time is changed in accordance with the thickness of the film to be formed.

In the described embodiment, it is assumed that the thickness of the film to be formed is 30μ. The external surface of the electro-cast film 18 is finished smoothly by lapping. A plate 20 having a plurality of fine bores 19 is obtained as the electro-cast film 18 is peeled off after this finishing. A multi-nozzle head connected to an ink supplying section is formed with this plate 20.

Although in the described embodiment the mold member 1 has a rectangular parallelepiped shape, this shape is not exclusive and the mold member 1 can have other shapes.

In the described embodiment, a plate having a plurality of fine bores is formed by a process which has the steps of forming a mold beforehand, forming a plurality of plastic sheets from a thermoplastic resin using the mold, forming electro-cast master by effecting a treatment on the plastic sheets to make the latter conductive; forming an electro-cast film on each electro-cast master and separating the electro-cast film from each master. The fine bores formed in the plate have strictly equal diameter because the shape and size of these bores conform those of the wire, so that it is possible to obtain a uniform characteristic of the multi-nozzle head for jetting a liquid. In addition, the plate made of a metal exhibits a high durability. Thus, according to this embodiment, it is possible to form a plurality of fine bores easily in a metallic plate. In addition, the fine bores are formed at a high precision of pitch and array. Further, the mold can be used repeatedly once it is formed. The formation of the mold itself can be made quite easily.

A second embodiment of the invention will be described hereinafter with reference to FIGS. 12 to 32. According to this embodiment, a holding member 21 is formed first of all. This holding member 21 has two side plates 23 each having V-shaped guide portions 22 in its upper edge, the two plates 23 being united with each other by means of bolts 25 with a ⊐-shaped intermediate member 24 placed therebetween. A space 26 is formed in the same side as the guide portions 22. A continuous wire 27 of a predetermined diameter is wound around this holding member 21 and received by the guide portions 22. Then, a pouring mold 28 is superposed to this holding member 21. The pouring mold 28 is also formed of two plates 29 and an intermediate member 30 which are united by means of bolts 31, and is provided with a space 32 which extends vertically therethrough. A resin as the base material 33 is poured into the spaces 26, 32, so as to cover the wire 27 in these spaces 26,32. The resin is then hardened at a room temperature or by a heating, and is extracted as a base material 34 with wire 27. In order to facilitate this extraction, it is preferred to apply beforehand a parting agent of silicon group to the inner surfaces of the spaces 26,32. During the extraction, the wires 27 coiled around the holding member 21 is cut at suitable portions.

Subsequently, the base material 34 with wire is shaped into a substantially rectangular parallelepiped form by a mechanical processing, and a surface perpenducular to the wire 27 is polished by an emery paper 35 to become a polished surface 36. An emery paper of a mesh of #300 to #1200 of Japanese Industrial Standard is used for the polishing.

The polished surface 36 is etched in an atmosphere of oxygen plasma. However, since the wire 27 cannot be etched, it projects in the form of protrusions from the surface of the base material 37. The height of protrusion is preferably 50μ or so. The surface 37 of the base material 37 is then subjected to a treatment for producing a conductivity. This treatment is effected by a silver mirror reaction (Ag), evaporation (Cu) and non-electrolytic plating (Ni), so as to form a film 38 of a thickness less than 1μ, thereby to form an electro-cast substrate 39.

An electro-cast film 40 is formed by effecting an electro-casting on the thus formed electro-cast substrate 39. In this embodiment, a nickel sulfaminate bath consisting of 400 g/l of nickel sulfaminate, 10 g/l of nickel chloride, 40 g/l of boric acid and a surface active agent for preventing pit was used as the electro-casting bath, under the condition of liquid temperature of 40°–60° C., PH value of 3.5 to 4.5 and electric current density of 2.5 to 20 A/dm². The formed electro-cast film 40 is of nickel and the thickness of this film is 30μ. Subsequently, the surface of the electro-cast film 40 was lapped and, after the removal of the wire 27 protruding from the film 40, the electro-cast film 40 is separated. As a result, a plate 42 is formed to have a plurality of fine bores 41 of the pitch and size coinciding with those of the wire 27. This plate 42 has a considerably high mechanical strength and can be used as a part of an ink jet plotter, at a high resistance against wear caused by the jetted liquid. In addition, since the fine bores are formed uniformly to have equal diameter, a uniform ink-jetting characteristic is obtained over the entire area of the plate, thereby to ensure a high stability of operation.

If the upper edge of the holding member 21 is formed to have a staggered stepped shape as shown in FIG. 24 and the guide portions 22 are formed at high and low portions alternatively, and if the pouring mold 28 is formed to match this stepped form of the holding member, it is possible to obtain a plate 42 having a staggered fine bores 41 as shown in FIG. 25.

As has been described, in the described embodiment, at first a wire is wound round a holding member while guided by the guide portions of the latter, and a pouring mold is matched to this holding member. Then, a molten resin is poured into the space or cavity to form a base material having a regularly arrayed wire. The base material is then subjected to the steps of formation of polished surface, etching in the atmosphere of oxygen plasma, formation of conductive film, formation of electro-cast film and separation of the latter, thereby to become a plate having a plurality of fine bores. Thus, this embodiment permit an easy production of a plate having a plurality of fine bores which are disposed at a high uniformity and which exhibit a greater durability.

Hereinafter, a description will be made as to a modification of the second embodiment. A base material 34 with wire as shown in FIG. 17 is cut into a predetermined shape by a mechanical processing, and the cut surface is finished by polishing. The state of finishing differs depending on the means for removing the wire 27. More specifically, the material 34 is shaped into a block 43 having the wire projected from one side thereof (See FIG. 26) or into a block 44 polished at its both surfaces (See FIG. 27).

Figure 26:
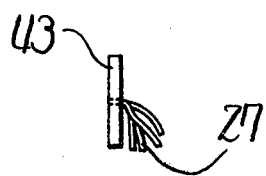
FIG. 26 is a side elevational view of a block used in another modification.

In case of the block 43 shown in FIG. 26, a plate 42 having fine bores 41 shown in FIG. 23 is formed by clamping and extracting the wire 27. To facilitate the extraction, it is preferable to apply beforehand a parting agent to the wire 27.

Figure 27:
FIG. 27 is a side elevational view of a block used in still another modification.
Figure 28:
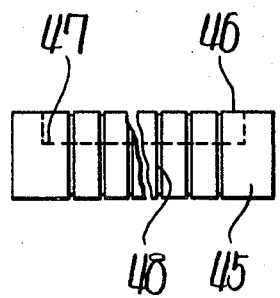
FIG. 28 is a front elevational view of a modification of the holding member.
Figure 29:
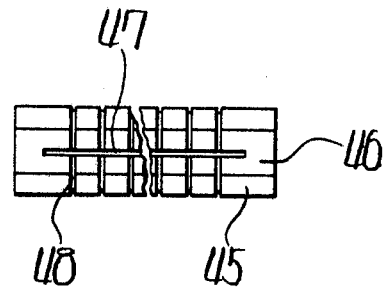
FIG. 29 is a plan view of the holding member shown in FIG. 28.
Figure 30:
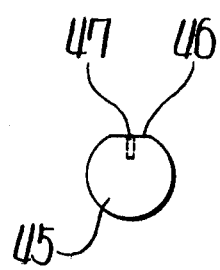
FIG. 30 is a side elevational view.
Figure 31:
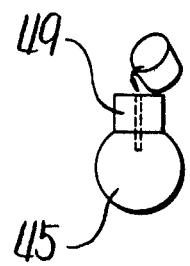
FIG. 31 is a side elevational view showing the state of pouring of base material.

On the contrary, in case of the block 44 shown in FIG. 27, the block 44 is immersed to a liquid corrosive to the wire 27 so as to corrode and remove the wire 27 thereby to complete a plate 42 having fine bores 41. In this case, stainless steel, copper, aluminum or the like material is used as the material of the wire 27. Also, the corrosion liquid is selected in accordance with the kind of material of the wire. For instance, an aqueous solution of sodium hydroxide is used for the wire made of aluminum. When the wire is made of iron or copper, an aqueous solution of ferric chloride, inorganic acid such as nitric acid or an admixture of these aqueous solution and inorganic acid is used. When the wire is made of copper solely, an aqueous solution of ammonium persulfate is used besides the above-mentioned corrosion liquids. Finally, nitrohydrochloric acid is used as the corrosion liquid when the wire is made of platinum.

Another modification of the second embodiment will be described hereinunder with reference to FIGS. 28 to 31. In this modification, the holding member 45 is formed as a round bar on which formed is a flat surface 46. A cavity 47 of a predetermined depth is formed in the flat surface 46. Groove-like guides 48 for guiding the wire 27 is formed on the periphery of the round bar including the flat surface 46. In this case, the guides 48 for the wires have to be parallel to one another and perpendicular to the cavity 47 at least in the area of the flat surface 46.

This holding member 45 is used in combination with a pouring mold 49. A plate 42 as shown in FIG. 23 is formed by the same process as the preceding embodiment.

Figure 32:
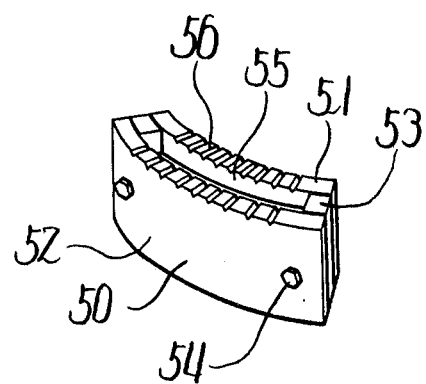
FIG. 32 is a perspective view of still another modification of the holding member.
Figure 33:
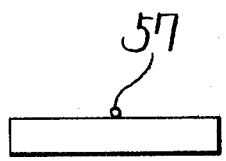
FIG. 33 illustrates a step of a third embodiment of the invention in which a wire is placed on a glass plate.
Figure 34:
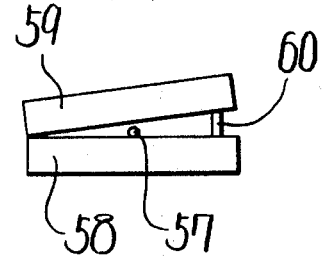
FIG. 34 is a side elevational view showing the state set in an electric lamp.
Figure 35:
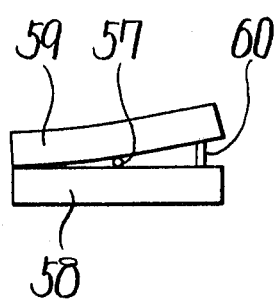
FIG. 35 is a side elevational view of a deforming process.
Figure 36:
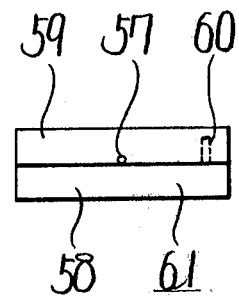
FIG. 36 is a side elevational view of a glass body.
Figure 37:
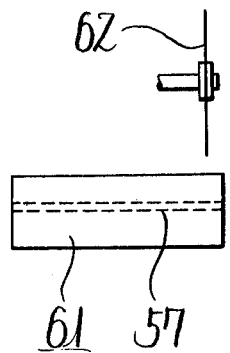
FIG. 37 is a front elevational view in the state of cutting.
Figure 38:
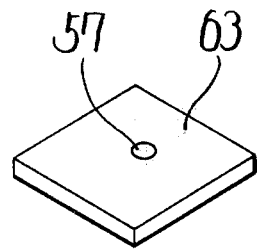
FIG. 38 is a perspective view of a block segment cut out from the block.
Figure 39:
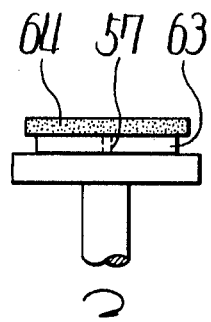
FIG. 39 is a side elevational view in the state of polishing.
Figure 40:
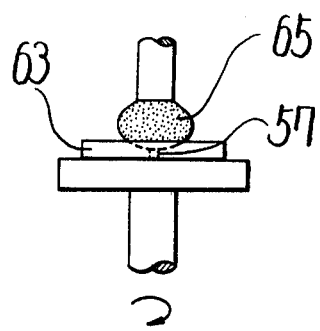
FIG. 40 is a side elevational view of a state in which a spherical recess is formed.
Figure 41:
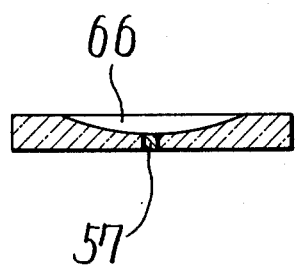
FIG. 41 is a sectional view of the block in the state after completion of a mechanical processing.
Figure 42:
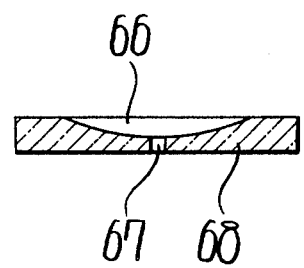
FIG. 42 is a sectional view of a chip having a fine bore.
Figure 43:
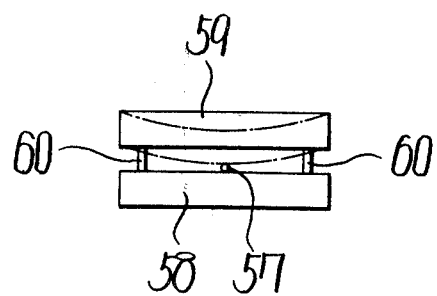
FIG. 43 is a side elevational view of a modification in the state set in an electric oven.

Still another modification of the second embodiment will be described with reference to FIG. 32. This Figure shows a holding member 50 for obtaining an arcuate plate 42 curved in an arcuate form. This holding member 50 is constituted by a pair of side plates 51,52 formed concentrically and united with each other by means of bolts 54 with an intermediate member 53 placed therebetween. A cavity 55 and guides 56 are formed as illustrated. The method of using of this holding member 50 is materially identical to that of the embodiment described before.

In the described embodiment, the plate 42 has a tabular form. It is, however, possible to form a box or liquid chamber simultaneously in a unitary form with the plate 42 when it is used as the nozzle of an ink jet plotter. It is also possible to use an injection molding technique.

A third embodiment of the invention will be described hereinafter with reference to FIGS. 33 to 43. First of all, a wire 57 having a diameter coinciding with that of the desired fine bores is prepared. The wire 57 is preferably made of a metallic material such as nickel, stainless steel, tungsten or the like. In this embodiment, a stainless steel wire of 30μ diameter is used as the wire 57. The wire 57 is placed on a glass plate 58 of a suitable thickness. An explanation will be made hereinunder as to the case in which only one fine bore is formed, by way of example. However, when it is desired to form a multiplicity of fine bores, wires 57 are placed on the glass plate 58 in such a manner as to contact one side of the glass plate by means of jigs for supporting the wires 57 parallelly. Then, another glass plate of the same material as the first mentioned glass plate 58 is superposed to the latter. A spacer 60 made of an inorganic material is placed between these glass plates at one side of the latter.

The assembly is then placed in an electric oven and heated up to a temperature higher than the softening temperature of the glass plates 58,59, e.g. 800° C. or higher. In consequence, the glass plates 58,59 are softened and the upper glass plate 59 is deformed due to its weight to join the lower glass plate 58 from one end of the latter, so that the two glass plates are gradually joined to each other.

Then, after an elapse of a predetermined time, the wire 57 and the spacer 60 are embedded in the glass structure 58,59. Thus, an integral glass member 61 having a unitary wire 57 is formed.

The glass member 61 thus formed is cut at its peripheral portion to have a desired shape and size and is cut at a right angle to the direction of the wire 57 into slices by means of a cutter 62. Thus, blocks 63 are formed to have wire 57 at their core portions. The surface of this block 63 is then polished and smoothened and, subsequently, processed by a spherical tool 65 to have a spherical recess 66.

Subsequently, the wire 57 is dissolved and removed by means of a warm solution of ferric chloride to leave fine bores 67 of the same diameter as the wire 57. Finally, the block is rinsed with water and dried to become a chip 68 having a fine bore 67, thus completing the formation of the chip 68.

According to the described embodiment, the fine bore 67 is formed at a high precision, because its diameter exactly coincides with that of the wire 57 and because the circularity and cylindricalness of the same are identical to those of the wire 57.

In practically carrying out this method, the arrangement may be such that two spacers 60 are placed between the glass plates 58,59 with the wire 57 placed therebetween, so that the wire 57 is embedded first as the heating is continued. The spacer or spacers 60 are used to exclude the trapping of air bubbles between the glass plates 58,59.

In the described embodiment, the fine bore can be formed in quite an easy way by a process having the steps of placing a wire between two glass plates and heating them to form an integral glass member embedding the wire therein, effecting a required processing such as cutting, grinding and so forth and then removing the wire by melting or the like measure. Thus, the fine bore is formed at a high precision not only in the diameter but in the circularity and cylindricalness as well. In addition, it is quite advantageous that a glass which is comparatively cheap can be used as the material.

What is claimed is:

1. A method of producing a multi-nozzle head having fine bores comprising the steps of: winding a wire of a diameter coinciding with the diameter of the fine bores to be formed around a mold member having a flat surface in such a manner that the turns of the wire extend in parallel with one another on the flat surface of the mold member; forming on said flat surface an electro-cast layer having a thickness large enough to embed said wire and coat said flat surface; polishing the exterior surface of the electro-cast layer to make the same flat; attaching another mold member of the same material as the first-mentioned mold member to the latter; forming a polished surface on at least one of said mold members in a direction perpendicular to said wire, removing said wire to a desired depth by dissolution to form a shaping mold having cavities, pressing a heated thermoplastic resin onto said polished surface and against said cavities by using said shaping mold and then separating said resin, thereby to form a plastic sheet having a plurality of projections of the same diameter as said wire, effecting a treatment for obtaining a conductivity on said plastic sheet thereby to form an electro-cast master; forming an electro-cast film on said master; effecting a lapping on said electro-cast film; and separating said electro-cast film, thereby to obtain a plate having a plurality of fine bores.

* * * * *